US011418609B1

(12) United States Patent
Das et al.

(10) Patent No.: US 11,418,609 B1
(45) Date of Patent: Aug. 16, 2022

(54) IDENTIFYING OBJECTS USING NETWORKED COMPUTER SYSTEM RESOURCES DURING AN EVENT

(71) Applicant: International Business Machines Corporation, Armonk, NY (US)

(72) Inventors: Anindita Das, Austin, TX (US); Hemant Kumar Sivaswamy, Pune (IN); Vinod A. Valecha, Pune (IN); Dinesh Kumar B, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/304,221

(22) Filed: Jun. 16, 2021

(51) Int. Cl.
*G06F 15/16* (2006.01)
*H04L 67/52* (2022.01)
*H04L 67/12* (2022.01)

(52) U.S. Cl.
CPC .............. *H04L 67/18* (2013.01); *H04L 67/12* (2013.01)

(58) Field of Classification Search
CPC combination set(s) only.
See application file for complete search history.

(56) References Cited

U.S. PATENT DOCUMENTS

| 10,286,179 | B2 | 5/2019 | Giap | |
|---|---|---|---|---|
| 10,413,363 | B2 | 9/2019 | Fahim | |
| 2012/0016690 | A1* | 1/2012 | Ramarajan | G16H 70/20 |
| | | | | 705/2 |
| 2015/0025908 | A1* | 1/2015 | Lakshminarayan | G16H 10/60 |
| | | | | 705/3 |
| 2017/0323062 | A1 | 11/2017 | Djajadiningrat | |
| 2019/0231436 | A1 | 8/2019 | Panse | |
| 2019/0282324 | A1 | 9/2019 | Freeman | |
| 2019/0333276 | A1* | 10/2019 | Brown | A61B 90/50 |
| 2019/0392924 | A1* | 12/2019 | Bettencourt-Silva | |
| | | | | G16H 70/40 |

FOREIGN PATENT DOCUMENTS

KR 102077607 B1 2/2020

OTHER PUBLICATIONS

"Augmented reality CPR training unveiled", Industrial Safety & Hygiene News, Mar. 23, 2018, 2 pages, <https://www.ishn.com/articles/108301-augmented-reality-cpr-training-unveiled>.

(Continued)

*Primary Examiner* — Normin Abedin
(74) *Attorney, Agent, or Firm* — Michael A. Petrocelli

(57) ABSTRACT

A computer is used to identify objects related to an event using networked computer system resources. A request is received to assess objects within a vicinity of an event for uses related to the event. A type of event is determined and objects identified within the vicinity. The identified objects are assessed for applicability relating to the event. The identified objects are scored based on applicability of each of the identified objects to the event. The identified objects are ranked based on the score for each of the identified objects, and based on accessibility factors for each of the identified objects, and the accessibility factors include locations of the identified objects, respectively, within the vicinity. A notification is sent to a user's device with the ranking for viewing by a user on a display of the user's device.

18 Claims, 10 Drawing Sheets

(56) References Cited

OTHER PUBLICATIONS

Fromm, et al., "The Potential of Augmented Reality for Improving Occupational First Aid", 14th International Conference on Wirtschaftsinformatik, Feb. 2019, 15 pages, <https://www.researchgate.net/publication/330983141>.

Mell, et al., "The NIST Definition of Cloud Computing", National Institute of Standards and Technology, Special Publication 800-145, Sep. 2011, 7 pages.

Sanchez, Jasmine, "Augmented Reality in Healthcare", PlugandPlay, Jan. 13, 2020, 9 pages, <https://www.plugandplaytechcenter.com/resources/augmented-reality-healthcare/>.

* cited by examiner

IDENTIFYING OBJECTS USING NETWORKED COMPUTER SYSTEM RESOURCES DURING AN EVENT

BACKGROUND

The present disclosure relates to identification of objects related to an event using networked computer system resources, and, and more specifically, the present disclosure relates to using Internet connected devices such as an augmented reality device, and/or Internet of Things (IoT), and/or cloud based computer systems to identify appropriate objects during an event for use in relation to the event.

In one example, an event such as an emergency event or an emergency medical event, can be the cause for people, personnel, or emergency personnel to need and search for objects such as tools or supplies. In some cases, there is an urgency to finding these objects. For example, when there is an incident such as an accident, people can search for objects to use to attend or address the incident. In one instance, when a person is unaware of the qualities of the different objects around them and how they relate to particular incidents, this can cause delays in attending to the incident which can include an injury to a person. A delay in a person obtaining the right object can mean increased damaging effect of an incident, such as worsening an injury.

SUMMARY

The present disclosure recognizes the shortcomings and problems associated with current techniques for informing a person of availability and/or location of an object needed in an event or situation.

The present invention includes a method and system for informing a person of availability and/or location of an object needed in an event or situation. The present invention addresses the knowledge gap of where to find available objects and makes effective utilization of identifying the right object or needed object in a vicinity to address the situation or event.

In an aspect according to the present invention, a computer-implemented method for identifying objects related to an event using networked computer system resources includes receiving a request, at a computer, to assess objects within a vicinity of an event for uses related to the event. The method includes determining, using the computer, a type of the event and identifying objects within the vicinity based on information received from a device at the vicinity. The method includes assessing the identified objects, using the computer, for applicability relating to the event, and scoring the identified objects based on applicability of each of the identified objects to the event. The method includes ranking the identified objects based on the applicability score for each of the identified objects, and based on accessibility factors for each of the identified objects. The accessibility factors include locations of the identified objects, respectively, within the vicinity. The method includes sending a notification, using the computer, to a user's device with the ranking for viewing by a user on a display of the user's device.

In a related aspect, the objects applicability relates to a parameter of the event, and the parameter includes a data point about the event relevant to a proposed action in response to the event.

In a related aspect, the proposed action in response to the event includes a procedure in response to the event.

In a related aspect, the procedure includes a medical procedure or an emergency action related to the event.

In a related aspect, the event is a medical emergency.

In a related aspect, the user's device includes or communicates, at least in part, with an augmented reality (AR) device, the AR device being wearable by the user to assist in locating identified objects.

In a related aspect, the method can further include sending a communication to the user' device which includes instructions regarding one or more of the identified objects and the type of the event.

In a related aspect, the method can further include assessing the information received from the device at the vicinity for identification of a plurality of objects; and generating a confidence score, using the computer, for an identification of one of the identified objects based on comparing the information to a knowledge corpus.

In a related aspect, the method further including assessing the information received from the device at the vicinity for identification of a plurality of objects, and assessing the information for applicability of the plurality of object to the event. And the method includes generating confidence scores, respectively, using the computer, for an identification of each of the identified objects, and for an applicability of the identified object, based on comparing the information to a knowledge corpus.

In a related aspect, the method further including determining the location of the identified objects using networked devices.

In a related aspect, the method further including determining the location of the identified objects includes using devices electronically communicating using a computer network.

In a related aspect, the computer network includes the Internet and the devices communicate using IoT.

In a related aspect, the method further including generating a model at least in part incorporating the assessing of the identified objects, the scoring of the identified objects, and the ranking of the identified objects; updating a definition of the vicinity; updating the location of the objects in the updated vicinity; and updating the assessing of the identified objects for applicability relating to the event; updating the scoring of the identified objects based on each of the identified objects applicability relating to the event. The method including updating the ranking of the identified objects, based on the updated score and updated accessibility factors, the updated accessibility factors including the updated location of the updated identified objects, respectively, in relation to the user or the event. And the method including sending an updated notification to the user's device with the updated ranking for viewing by the user on the display of the user's device.

In a related aspect, the method further including iteratively updating the updated notification based detecting a change of a parameter of the event.

In a related aspect, the method further including initiating two way communications with an AR device available to the user; generating, using the computer communicating with the AR device, a recommendation for a procedure; communicating the procedure to the AR device for communication to the user; and iteratively communicating updated procedures to the AR device.

In a related aspect, the method further including receiving an update request from the AR device initiated by the user.

In a related aspect, the ranking of the accessibility factors includes the location of the identified objects, respectively, within the vicinity with respect to the user, and/or the type of the event, and/or a thing or a patient.

In a related aspect, the method further including generating, using the computer communicating with an AR device available to the user, a recommendation for a procedure; and communicating the procedure to the AR device for communication to the user.

In a related aspect, the method further including receiving acceptance of the recommendation for the procedure from the user's device.

In another aspect according to the present invention, a system using a computer for identifying objects related to an event using networked computer system resources includes: a computer system. The computer system includes; a computer processor, a computer-readable storage medium, and program instructions stored on the computer-readable storage medium being executable by the processor, to cause the computer system to perform the following functions to; receive a request, at a computer, to assess objects within a vicinity of an event for uses related to the event; determine a type of the event, using the computer, and identifying objects within the vicinity; assess the identified objects, using the computer, for applicability relating to the event; score the identified objects based on applicability of each of the identified objects to the event; rank the identified objects based on the score for each of the identified objects, and based on accessibility factors for each of the identified objects, the accessibility factors including locations of the identified objects, respectively, within the vicinity; and send a notification, using the computer, to a user's device with the ranking for viewing by a user on a display of the user's device.

In a related aspect, the system further includes the following to: generate a model at least in part incorporating the assessing of the identified objects, the scoring of the identified objects, and the ranking of the identified objects; update a definition of the vicinity; update the location of the objects in the updated vicinity; update the assessing of the identified objects for applicability relating to the event; update the scoring of the identified objects based on each of the identified objects applicability relating to the event; update the ranking of the identified objects based on the updated score, and updated accessibility factors, the updated accessibility factors including the updated location of the updated identified objects, respectively, to the user or the event; and send an updated notification to the user's device with the updated ranking for viewing by the user on the display of the user's device.

In another aspect according to the present invention, a computer program product provides identifying objects related to an event using networked computer system resources. The computer program product includes a computer readable storage medium having program instructions embodied therewith. The program instructions are executable by a computer to cause the computer to perform functions, by the computer, comprising the functions to: receive a request, at a computer, to assess objects within a vicinity of an event for uses related to the event; determine a type of the event, using the computer, and identifying objects within the vicinity; assess the identified objects, using the computer, for applicability relating to the event; score the identified objects based on applicability of each of the identified objects to the event; rank the identified objects based on the score for each of the identified objects, and based on accessibility factors for each of the identified objects, the accessibility factors including locations of the identified objects, respectively, within the vicinity; and send a notification, using the computer, to a user's device with the ranking for viewing by a user on a display of the user's device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
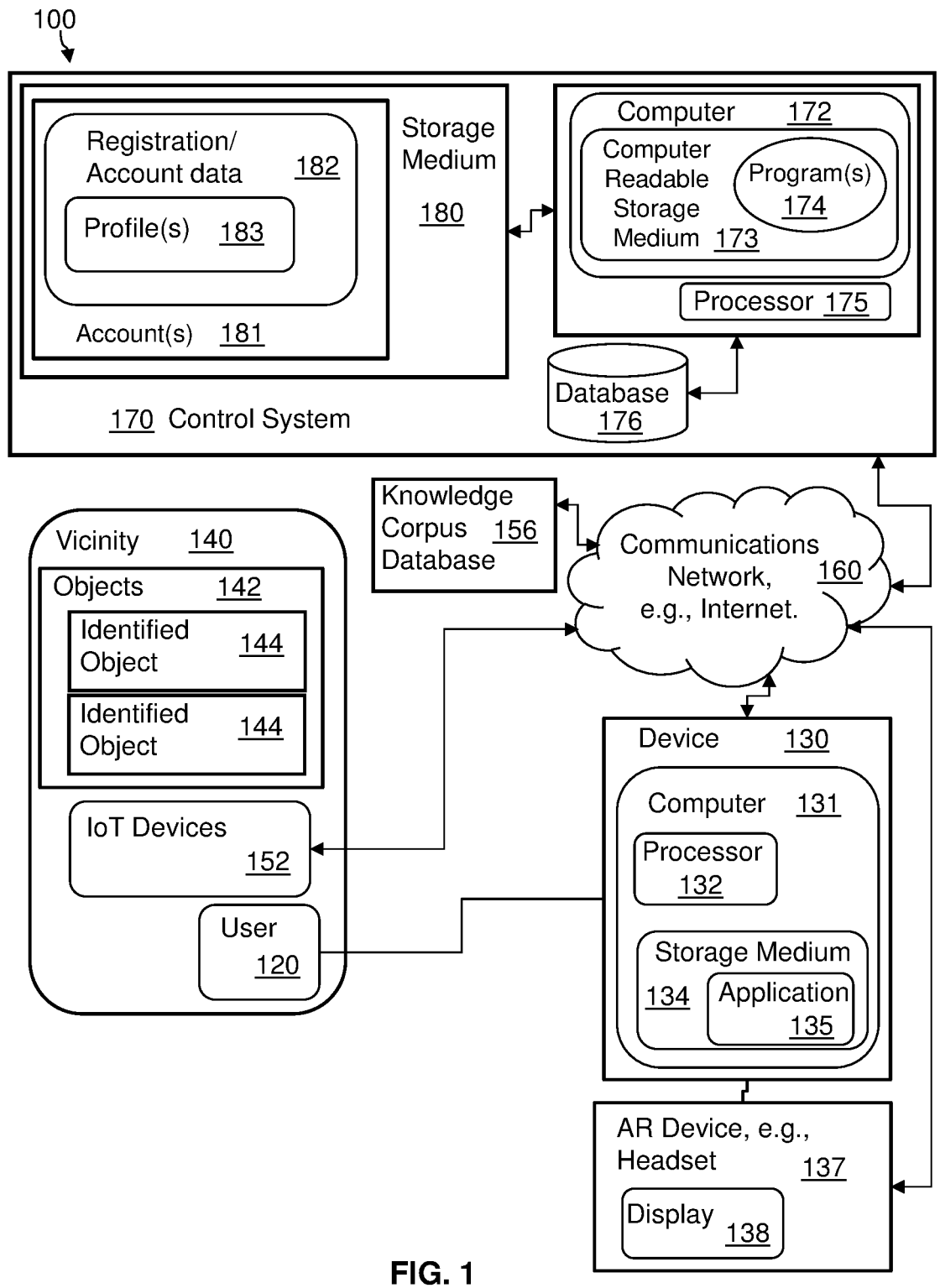
FIG. 1 is a schematic block diagram illustrating an overview of a system, system features or components, and methodology for identifying objects related to an event using networked computer system resources, according to an embodiment of the present disclosure.
Figure 2:
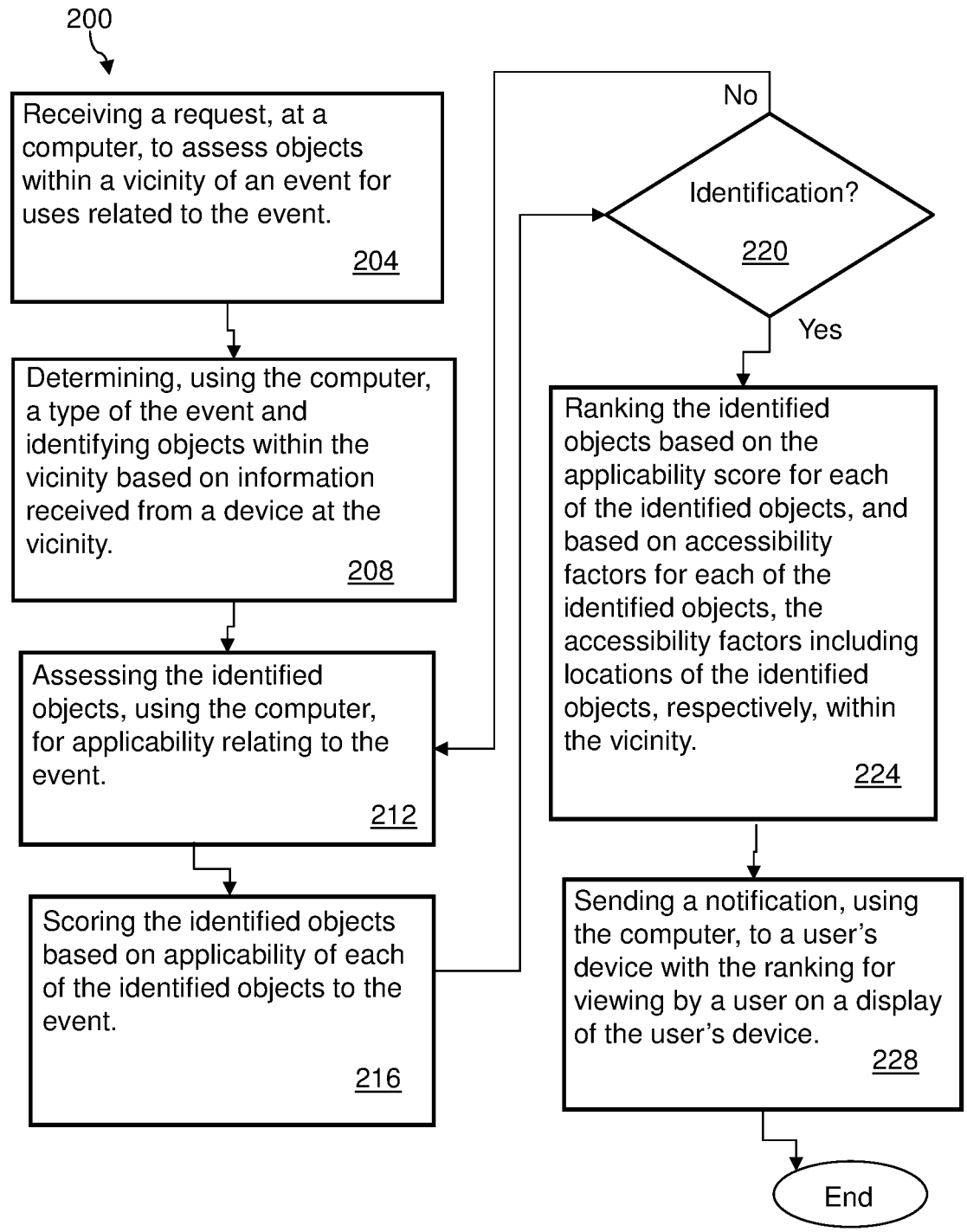
FIG. 2 is a flow chart illustrating a method, implemented using the system shown in FIG. 1, for identifying objects related to an event using networked computer system resources, according to an embodiment of the present disclosure.
Figure 3:
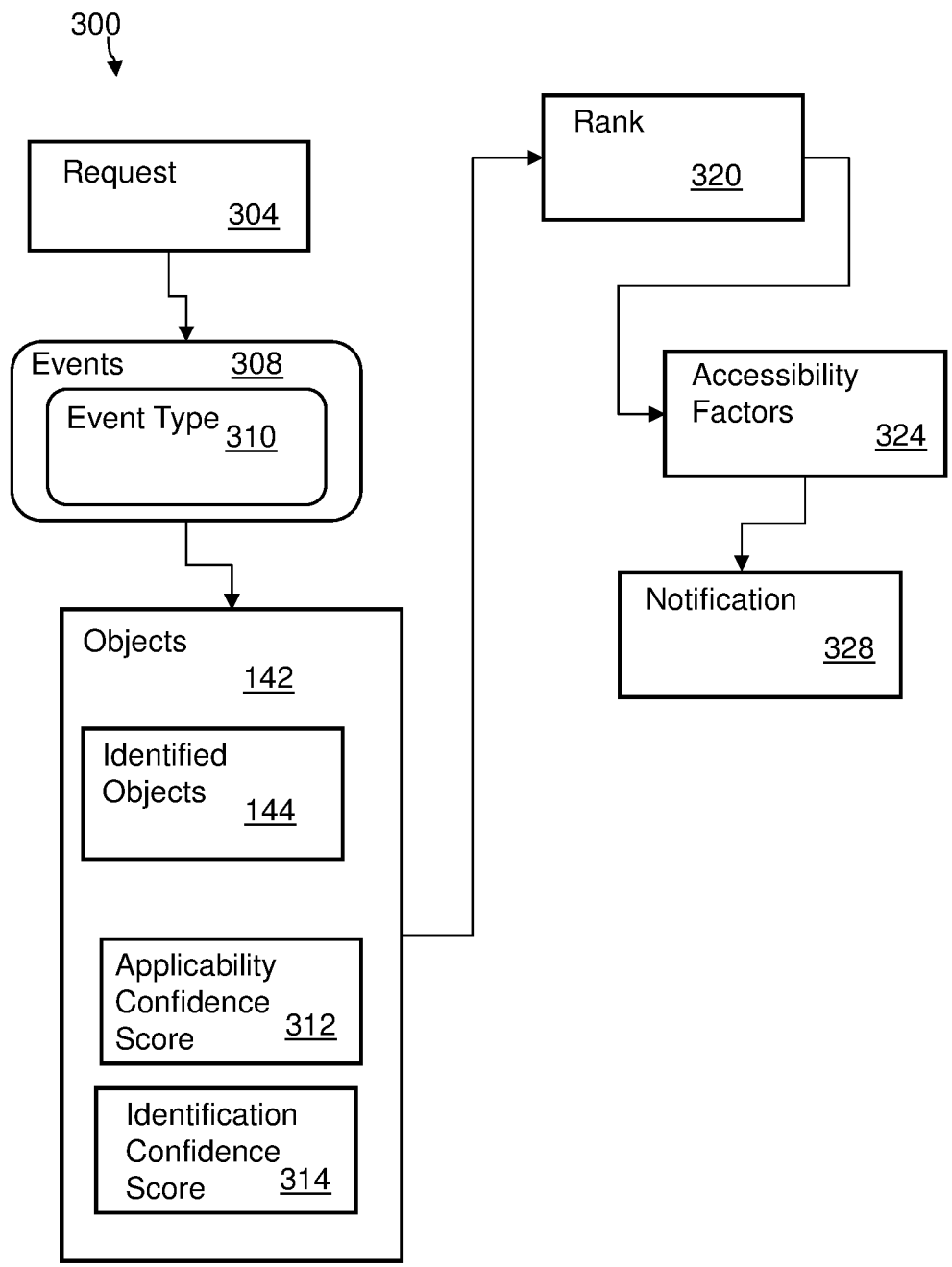
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for identifying objects related to an event using networked computer system resources, for implementing an action between multiple devices.

Referring to FIGS. 1, 2 and 3, a computer-implemented method 200 for identifying objects 142 related to an event 308 using networked computer system resources, e.g., Internet of Things (IoT) or the Internet, according to an embodiment of the present disclosure, includes operational actions and/or procedures. The computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes receiving a request 304, at a computer, to assess objects 142 within a vicinity 140 of an event 308 for uses related to the event, as in block 204. The computer 172 can be remote as part of a control system 170, or all or part of a remote server. In another example, the computer 131 can be part of a device 130. The device 130 can operate, in all or in part, in conjunction with a remote server by way of a communications network 160, for example, the Internet. The objects 142 can include items for use to perform a procedure to address an event. The objects can be used to address an event. For example, the items can be items for use in a medical procedure, or a procedure to douse a fire, or procedures to address other events or emergency events. The vicinity can be a define area such as a location of a person who will be a patient, or a building.

The method 200 can include determining, using the computer, a type of the event and identifying objects within the vicinity based on information received from a device at the vicinity, as in block 208. The computer can be used a knowledge corpus database 156 to determine a type of event 310. The knowledge corpus 156 can be populated by historical data gathered for all types of events 308, from previous histories, from data from those historical events inputted into the computer or directly into the corpus, and from device feeding input data into the computer or historical database, or from the computer to the corpus, such as from IoT devices, etc. The computer can use the knowledge corpus 156 to determine the type of event 310, for example, a medical emergency, a fire, a gas leak, chemical breach or other dangerous substances. Using IoT devices for receiving information about objects 142 in the vicinity, the computer, using the corpus, can identify objects, for use related to the event. Such identified objects 144 can be assessed for confidence or veracity of the identification. In one example, the computer can identify objects by comparing the visual picture or video feed of an object to the corpus database of items. The identification can be scored for veracity or confidence of identification with a confidence score 314. The identified objects can further be ranked by the highest score.

The method 200 includes assessing the identified objects 144, using the computer, for applicability relating to the event, as in block 212. The method includes scoring the identified objects based on applicability of each of the identified objects to the event, as in block 216, with the applicability score 312. Based on the scoring, the applicability score 312 can be applied to each identified object.

When the method is not able to make a satisfactory identification of objects, the method can return to block 212 to assess identified objects. When the method is able to make a satisfactory identification, the method proceeds to block 224. A satisfactory identification can be determined by setting a threshold for confidence in the identification. A satisfactory identification can include meeting a threshold of confidence such as a highest score of confidence or meeting a particular score of confidence.

The method can include ranking the identified objects based on the applicability score for each of the identified objects, and based on accessibility factors for each of the identified objects, the accessibility factors including locations of the identified objects, respectively, within the vicinity, as in block 224.

Sending a notification, using the computer, to a user's device with the ranking for viewing by a user on a display of the user's device, as in block 228.

A user can use an augmented reality device 137 having a display 138. In one example, the augmented reality (AR) device can be an AR headset. In another example, the augmented reality device can be AR glasses. Using the AR device can include a visual cue to a user, a selection of one or more options by the user, or a physical action such as a hand gesture or a finger pointing, wherein such physical actions can work in concert with the AR device to implement an action initiated by the user. The AR device can communicate with the user's device 130, and/or alternatively, communicate with a communications network 160.

In one example according to the present disclosure, objects applicability can relate to a parameter of the event. The parameter can include a data point about the event relevant to a proposed action in response to the event. For example, one or more data points can include chest pain, a person clutching their chest which can indicate a be person having medical issue, such as a possible heart attack. Such data can be collected by input from a user, e.g., a patient, a bystander using a communication technique such as, for example, IoT devices 152, smart devices, cameras or other audio enabled devices. The proposed action can include loosening a person's clothing, locating a defibrillator, etc. In another example, the proposed action in response to the event can include a procedure in response to the event. The procedure can include a medical procedure or an emergency action related to the event. In another example, the event can be a medical emergency.

In another example, the user's device includes or communicates, at least in part, with an augmented reality (AR) device, the AR device being wearable by the user to assist in locating identified objects.

In another example, the method can further include sending a communication to the user's device which includes instructions regarding one or more of the identified objects and the type of the event.

Figures 4A, 4B:
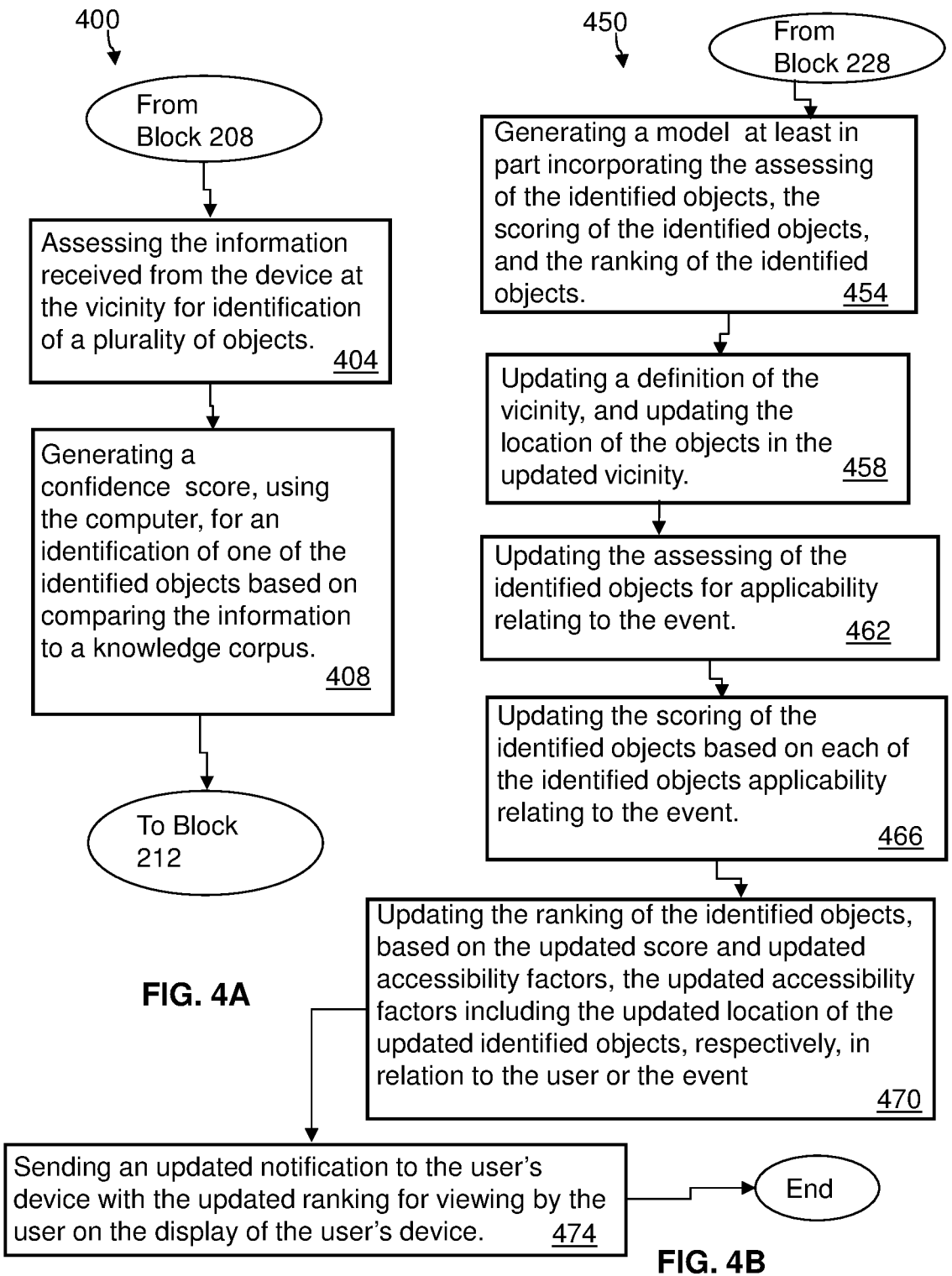
FIG. 4A is a flow chart illustrating another method, which continues from the flow chart of FIG. 2, for identifying objects related to an event using networked computer system resources, for implementing an action between multiple devices.
FIG. 4B is a flow chart illustrating another method, which continues from the flow chart of FIG. 2, for identifying objects related to an event using networked computer system resources, and which generates and uses a computer model.

Referring to FIG. 4A, a method 400 according to the present disclosure can continue from block 208 of the method 200 shown in FIG. 2, and include assessing the information received from the device at the vicinity for identification of a plurality of objects, as in block 404. The method 400 can generate a confidence score 314, using the computer, for an identification 144 of one of the identified objects based on comparing the information to a knowledge corpus 156. The method can include generating confidence scores, respectively, using the computer, for an identification of each of the identified objects, and for an applicability of the identified object, based on comparing the information to a knowledge corpus. For example, an object such as a defibrillator can be identified using an image supplied by an IoT device. The image can be compared to an image stored in the knowledge corpus and the method can assigned a confidence score based on similarity to the stored image. The method continues to block 212 of the method 200.

A method according to the present disclosure can include assessing the information received from the device at the vicinity for identification of a plurality of objects, and assessing the information for applicability of the plurality of objects to the event. For example, an objects such as a defibrillator can be identified using an image supplied by an IoT device. The image can be analyzed, using the knowledge corpus, to determine applicability to an event, and is assigned a confidence score of applicability for a task related to the event. For example, the method can use AI to determine that a person may be having a heart attack and need a defibrillator. The method assesses that an identified defibrillator is in the vicinity, communicates the location to a user 120, in the vicinity 140, and a confidence score of the defibrillators applicability to the possible heart attack. The method continues to block 212 of the method 200.

The method can further include determining the location of the identified objects using networked devices, such as IoT devices 152. The method can further include determining the location of the identified objects using devices electronically communicating using a computer network. In one example, the computer network includes the Internet and the devices communicate using IoT.

Referring to FIG. 4B, in another embodiment according to the present disclosure a method 450 can continue from block 228 of the method 200 shown in FIG. 2, and the method 450 includes generating a model at least in part incorporating the assessing of the identified objects, the scoring of the identified objects, and the ranking of the identified objects, as in block 454. The method includes updating a definition of the vicinity, and updating the location of the objects in the updated vicinity, as in block 458. The method includes updating the assessing of the identified objects for applicability relating to the event, as in block 462. The method includes updating the scoring of the identified objects based on each of the identified objects applicability relating to the event, as in block 466. The method includes updating the ranking of the identified objects, based on the updated score and updated accessibility factors, the updated accessibility factors including the updated location of the updated identified objects, respectively, in relation to the user 120 or the event, as in block 470. The method includes sending an updated notification to the user's device with the updated ranking for viewing by the user on the display of the user's device, as in block 474. The method can further include iteratively updating the updated notification based detecting a change of a parameter of the event.

In another example, the method can further include initiating two way communications with an AR device available to the user, and generating, using the computer communicating with the AR device, a recommendation for a procedure. The method can include communicating the procedure to the AR device for communication to the user; and iteratively communicating updated procedures to the AR device.

The method can further include receiving an update request from the AR device initiated by the user.

In one example, the ranking of the accessibility factors includes the location of the identified objects, respectively, within the vicinity with respect to the user, and/or the type of the event, and/or a thing or a patient.

In one example, the method can further include generating, using the computer communicating with an AR device available to the user, a recommendation for a procedure; and communicating the procedure to the AR device for communication to the user.

In one example, the method can include receiving acceptance of the recommendation for the procedure from the user's device.

Other Embodiments and Examples

Referring to FIG. 1, the device 130, also can be referred to as a user device or an administrator's device, includes a computer 131 having a processor 132 and a storage medium 134 where an application 135, can be stored. The application can embody the features of the method of the present disclosure as instructions. The user can connect to a learning engine 150 using the device 130. The device 130 which includes the computer 131 and a display or monitor 138. The application 135 can embody the method of the present disclosure and can be stored on the computer readable storage medium 134. The device 130 can further include the processor 132 for executing the application/software 135. The device 130 can communicate with a communications network 160, e.g., the Internet.

It is understood that the user device 130 is representative of similar devices which can be for other users, as representative of such devices, which can include, mobile devices, smart devices, laptop computers etc.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In another example and embodiment, profiles can be saved for users/participants. Such profiles can supply data regarding the user and history of deliveries for analysis. In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage. A user and a related account can refer to, for example, a person, or an entity, or a corporate entity, or a corporate department, or another machine such as an entity for automation such as a system using, in all or in part, artificial intelligence.

Additionally, the method and system is discussed with reference to FIG. 3, which is a functional system 300 which includes components and operations for embodiments according to the present disclosure, and is used herein for reference when describing the operational steps of the methods and systems of the present disclosure. Additionally, the functional system 300, according to an embodiment of the present disclosure, depicts functional operations indicative of the embodiments discussed herein.

Referring to FIG. 3, in one embodiment according to the present disclosure, a system 300 can be used to identify objects related to an event for use regarding the event by using networked computer system resources. In FIG. 3 similar components may have the same reference numerals as the system 100 shown in FIG. 1, the system 300 can include or operate in concert with a computer implemented method as shown in FIGS. 1 and 2.

More Embodiments and Examples

Figure 5:
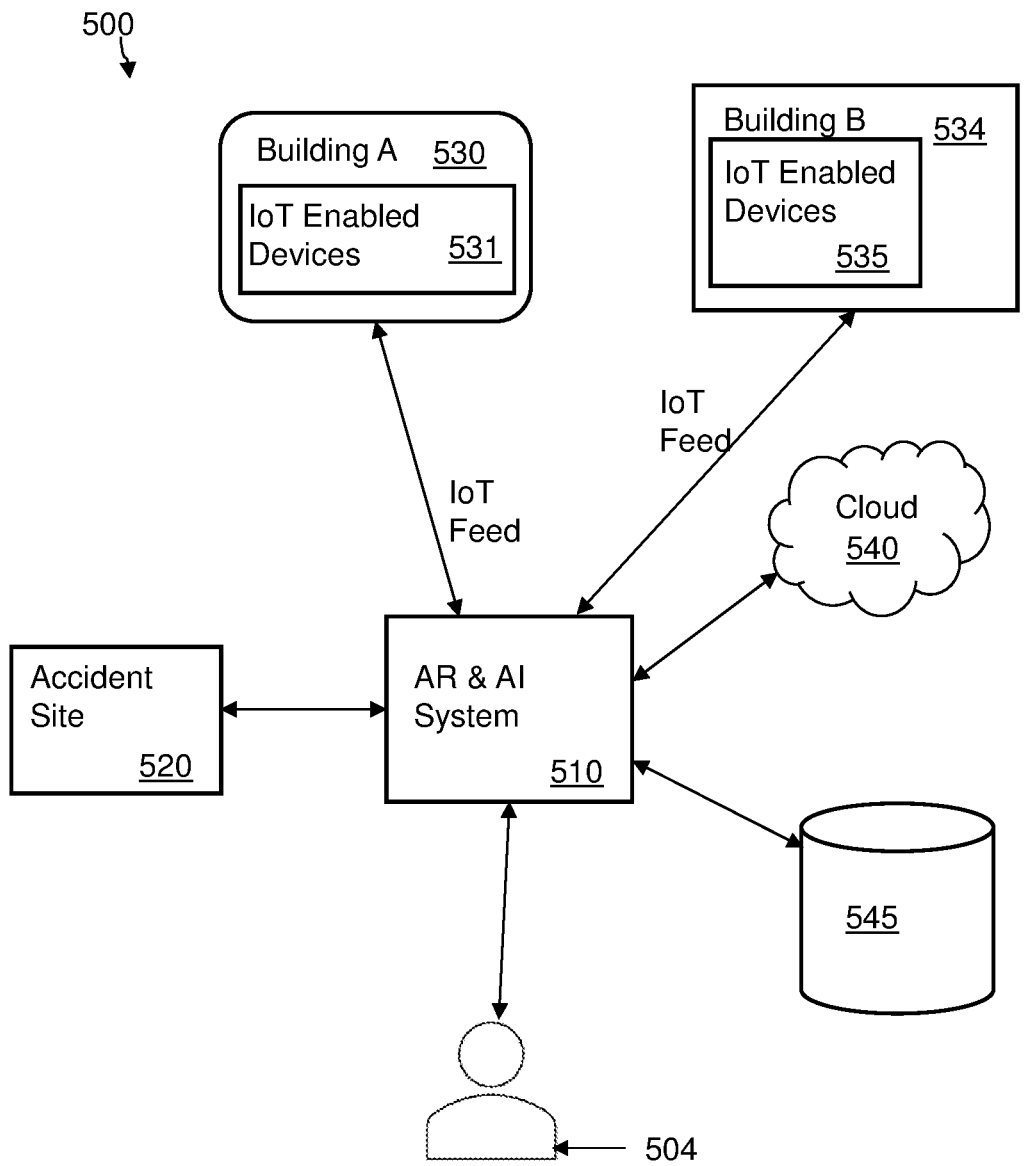
FIG. 5 is a block diagram illustrating another system according to an embodiment of the present invention, for identifying objects related to an event using networked computer system resources showing an augmented reality and artificial intelligence system.
Figure 6:
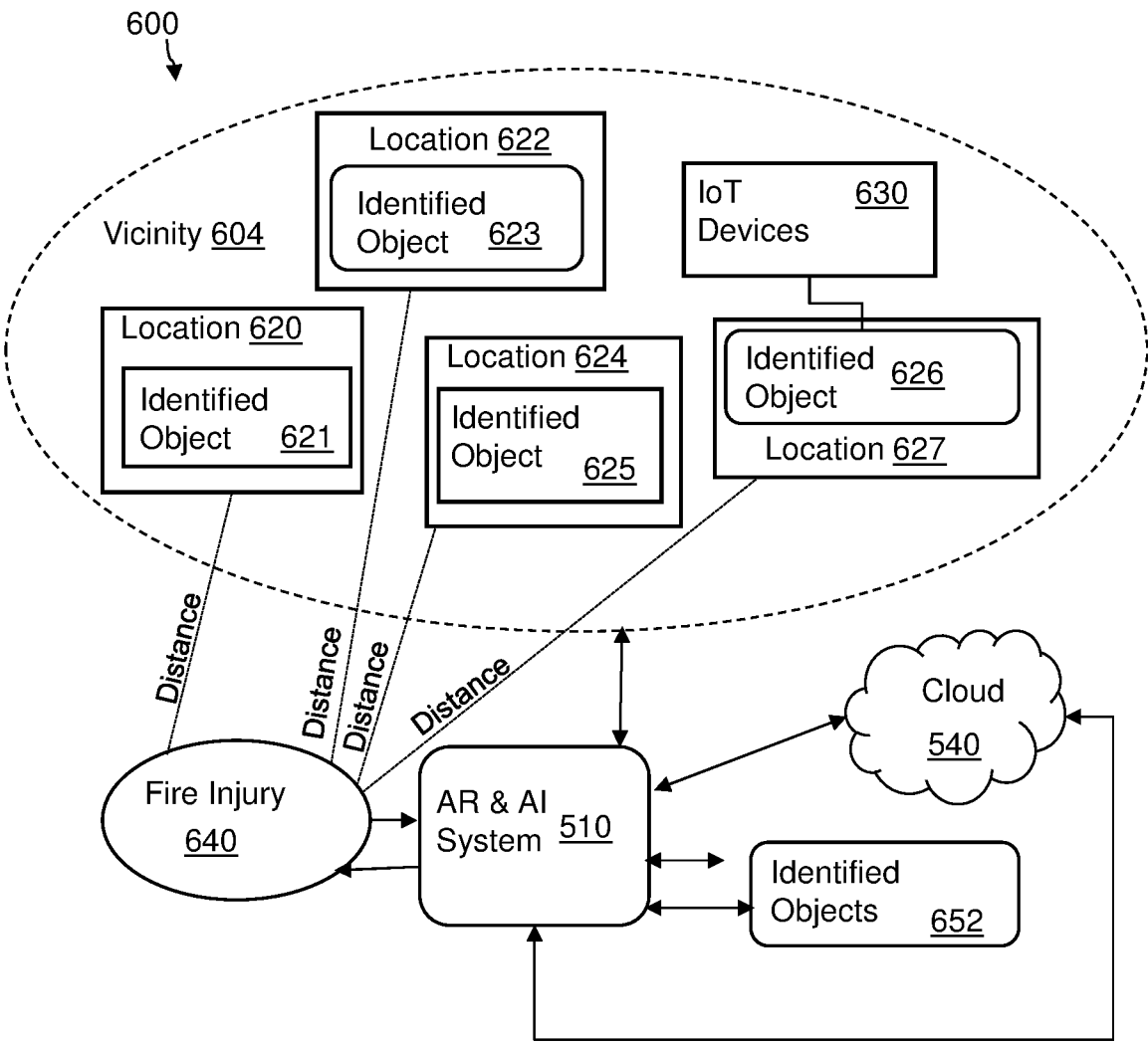
FIG. 6 is a block diagram illustrating another system according to an embodiment of the present invention, for identifying objects related to an event using networked computer system resources, showing an augmented reality and artificial intelligence system, and a vicinity and identified objects.

Referring to FIGS. 5 and 6, in one embodiment according to the present disclosure, a system 500 can be used to identify objects related to an event for use regarding the event by using networked computer system resources. According to the system 500 an AR (Augmented Reality) enabled wearable, such as an AR headset or AR glasses which is represented by AR & AI (Artificial Intelligence) system 510, can receive output from (Internet of Things) IoT feeds and compute a confidence score pertaining to objects 652 in the vicinity 604 using AI learning models and can rank the objects. For example, IoT feeds can include IoT enabled devices 531 in building A 530, and IoT enabled devices 535 in building B 534. Objects can be ranked based on proximity and appropriateness and guide the wearer/user 504 to the object and also guide on how to use the object to address/attend the incident or event, such as a fire injury 640 to a person, at an accident site 520.

An AR wearable can communicate with a computer, whether local or remote, to access data, historical data, learning models, or access data analysis for furthering operation of the present method and system. The AR wearable can determine identification and highlight applicability, sufficiency and appropriateness of objects from the vicinity to attend to an event, for example an emergency incident. The system can contextualize the incident/event, and combine with the IoT Feeds on properties of objects in the vicinity to derive a confidence score for appropriateness of the object to address the incident. A suggestion of the most appropriate treatment based on the context and a confidence score can be arrived at by an AI learning model using images obtained from the IoT devices in the premises and from an AR device and/or a virtual reality (VR) device in real-time.

A system and method can provide identification of appropriateness, sufficiency and applicability of random objects from the vicinity to attend to an incident. A confidence score can be computed for appropriateness of the random objects to address the incident. Awareness of the context, distance between different random objects, and user's accessibility to the premises, along with the appropriateness confidence score computed, can be used to arrive at ranked list of the random objects in the order of most suitable random object to fetch or use. An augmented reality device or artificial intelligence system 510 can be part of the system 600 and can include an augmented reality device or artificial intelligence (AR/AI). An AI module can be used to find suitable medical object to use from a plurality of objects. Thereby, an AR wearable can be used to obtain or assist in visualization of how an object/medical aid needs to be selected/shortlisted and used to treat the injury to be able to maximize the effect of using of certain objects.

Again referring to FIGS. 5 and 6, a system uses an AR enabled wearable, for example, a head gear or a lens (for example, a contact or smart glasses) worn by an onlooker. A vicinity can include where an action happens. The AR enabled wearable can read the injury and understand the extent of its damage. A picture can be taken as well for any contextual communication that is required. Upon identifying a medical emergency, the system can be activate into a first aid mode. The system in first aid mode can engage an AI Module to find the most suitable object to use from a list of ranked objects to use from the vicinity. The AR module can interact with the IoT devices present in the building. IoT devices (e.g., smart cameras and sensors) can help to identify the items which is needed during an emergency in the building which is IoT enabled, for example, building A 530 and building B 534. The AI model can suggest the best possible action to be taken among a host of other possible solutions. (for example, a person injured and bleeding from a fire accident 640 can be treated differently against a person bleeding with a cut injury).

A computer (AI Component/Engine) computes a confidence score for appropriateness of the object to use, by making use of a pre-existing corpus from augmented reality/virtual reality (AR/VR) databases for previous incidents and how they were attended to. An IoT component feed, smart cameras and sensors in the building can help to identify the objects needed for a particular emergency. For example, the system can identify bedsheets in a retiring room, curtains from the windows and store the location. The system could also in real-time use a bounding box in object detection to help identify the most appropriate item to be used. example, a thick cloth could be used to put out a fire. A feed could also help with identifying trained personnel in the vicinity, and use the data stored in the database about the trained personnel in the building. The system 510 can identify objects 652 and its properties and share the feed to an AI Engine/Component, which can also be part of the system 510. For example, the system 510 can determine fire escape routes, and nearest position of first aid kits. The system can gather the context by image analysis, and based on the context, the AI module can generate a confidence score and can suggest the most appropriate action to be taken. The system can compute the confidence score for appropriateness of the object to use. A knowledge corpus of appropriateness of properties of objects known to be effective in particular incidents, can also be determined by the system. The system can also include a knowledge corpus of previous incidents and how they were attended to. The system 510 can gather context of incidents and can suggest confidence scores on appropriate actions to speed up recovery. Context can be gathered through Image recognition. The system can compute ranking of each object based on the accessibility. Accessibility can be determined by access rights to the vicinity, distance, and proximity to the object. Factors that can influence appropriateness scoring can include effectiveness, distance, context and accessibility.

In one example, between two objects effectiveness can be the same when the two objects have the same properties. If one of the objects is closets or nearer to a user, the nearer object can be selected. In a situation where objects are an equal distance from a user, and one object is more effective or appropriate, the more effective object can be selected or picked by the system and the user notified or alerted to select the object.

In another example, the system can select between objects by determining context which can include whether an object is near to a user, and effectiveness of an object, and comparatively analyze the objects. Context can also include urgency, a type of injury, and context can be decided by an onlooker, or a person wearing an AR.

In one example, in attending to a fire or treating a person who has been burned by a fire, context can be more important than location (e.g., how close an object is to a user), that is, the effectiveness in dampening or dousing a fire can be more important than the closeness of an object. In another example, location or an object being the nearest can be more important than effectiveness. Accessibility can also be a factor that influences a final ranking. An AR system can use a list and can augment the field of vision with a ranked list and a path to an object that is high on the list of an appropriate object and/or has the highest rank. The system can assist with the navigation and any information that is required to obtain the object. An AR system can initiate an active interaction with an expert/chatbot to help in further speeding up selection of the right objects and the objects application in the right or proper way.

In another example, the system can run a visualization using an AR device of how an object needs to be used. A visualization can simplify and guide the onlooker on how to go about using the object for the specific injury. The system can engage a first aid expert or a doctor based on a degree of injury, and can share with them the selected object and visuals of the affected area, and the contextual information. In one example, upon a doctor's/first aid expert's consent to extend help, the system can engage a real-time assistance mode. In a real-assist mode, an expert's advice can be conveyed to the onlooker on how to handle the affected person and the affected area better. In one example, providing augmented guidance on how to apply/use can be either by video or instructions overlaid on the affected area visible/viewable using an AR device by a user.

In another example, a method and system can include an accident/incidence data is read by the AR/AI system 510 regarding the accident site 520. The context of the incidence is identified. Objects, 621, 623. 625, 627 in the vicinity 604 are identified along with the distance to each of them. Each of the objects has a location 620, 622, 624, 626, respectively. A usefulness of each object against the identified context is computed. A confidence score is computed for each identified object for relevance to treatment of the identified incidence context. The system creates a ranked list of objects to indicate accessibility, and gets the steps to use the shortlisted object(s). Augments the AR Wearable with path to the shortlisted object and steps to attend to the incidence. In another example, for a fire incident an AR system in conjunction with a feed from IoT devices 531, 535 identifies the context to be a fire injury, and the fire is active, and needs to be extinguished or doused. Based on IoT feeds, objects are found in the vicinity, which can include for example, polyester cloth at 20 m in a first location, a curtain at 30 m in a second location, and blankets at 100 m in a third location. A system can output rules with regards to appropriateness to douse an active based on a trained AI model through image recognition which knows what to pick against. Objects can be highlighted in a display of an AR Wearable, the shortlisted objects are ranked based on quick accessibility, and the object. A wearable is augmented with the list and a path to reach the highest ranked, object can be displayed. A wearable also displays how the object is to be used to address the context.

In one example according to the present disclosure, different types of emergencies where embodiments of the present disclosure can be used include an event such as a fire resulting in a burn injury. A system could help identify what type of cloth could be used to block oxygen effectively to put out the fire; where is the nearest water point to use, and so on. In another example, in an inflammation (e.g., a non-fire, no bleeding injury) event, the method and system can identify what object is cold enough to use as a cold pack. In another example, for a bleeding injury, the method and system can assist in locating bandages or other object for stopping bleeding. In another instance, an expert using a device can be connected to a user on site to communicate how to treat an injured area to reduce the blood flow to the affected area. In another example, if a person is choking, in one example a child, special guidance may be needed when addressing choking for a child. In this case, it may be appropriate for guidance by communication using devices from an expert. The expert may also be able to have a live video feed of the person or patient using, for example, an augmented reality (AR) device. By way of the examples and embodiments in the present disclosure a system can arrive at a confidence score to guide the rescuer to the most relevant object from a user's surroundings that could be used to help heal/attend to the injury immediately to reduce the injury or the incident from getting worse.

More Examples and Embodiments

Operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

Additional Examples and Embodiments

Figure 7:
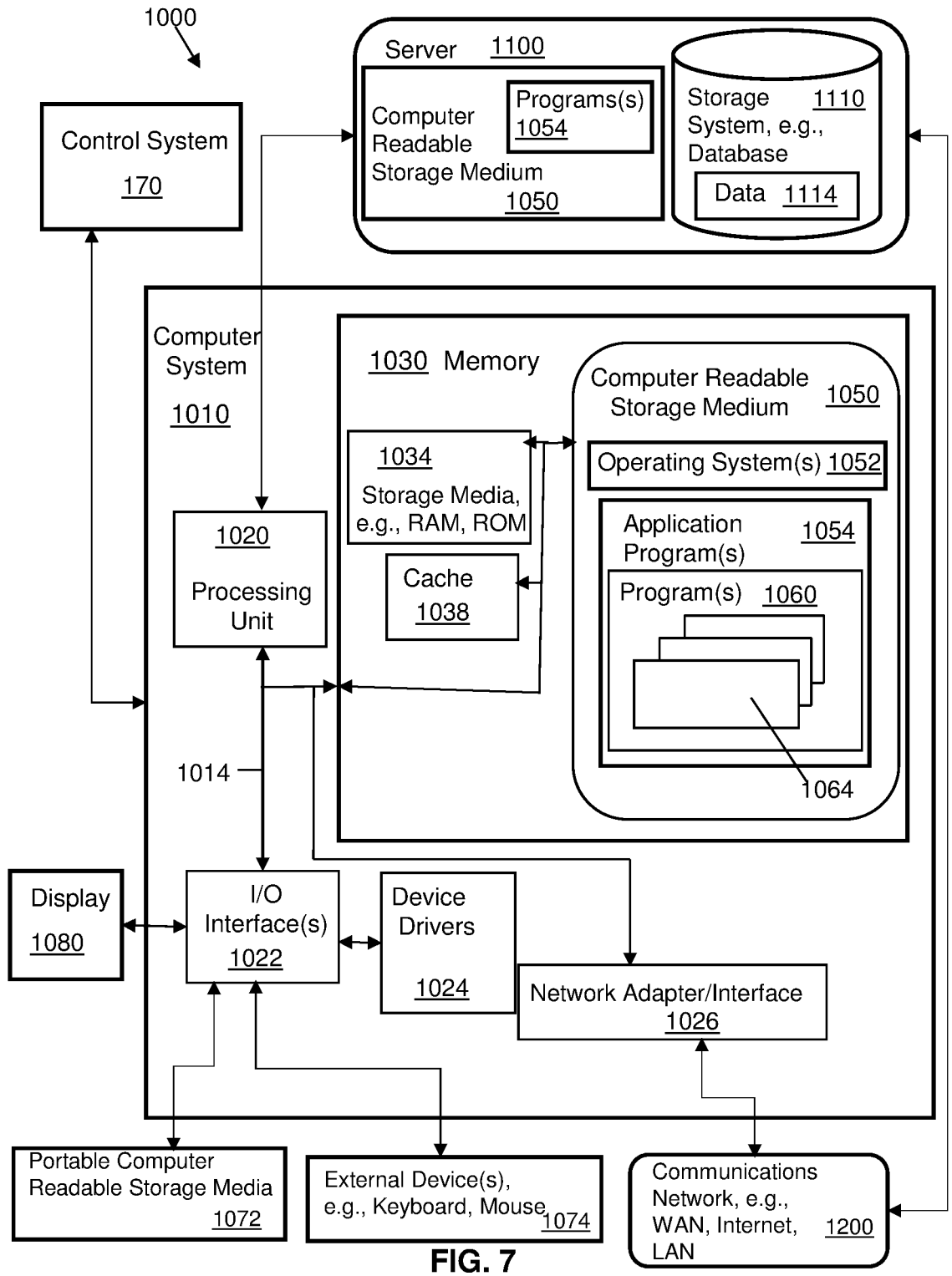
FIG. 7 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 7). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 135, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 135 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 7 and described in more detail in regards thereto referring to one or more computer systems 1010.

Thus, in one example, a control system 170 is in communication with the computer 131 or device 130, and the computer can include the application or software 135. The computer 131, or a computer in a mobile device 130 communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 135, which can include program instructions executable using a processor 132. These features are shown herein in FIG. 1, and other similar components and features are also in an embodiment of a computer system shown in FIG. 7 referring to a computer system 1010, which may include one or more computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 135. In one example, the application 135 is stored on a device, for example, a computer or device on location, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 135. The application 135 is stored on the device or computer and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user. A user can include, for example, a corporate entity, or department of a business, or a homeowner, or any end user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model for monitoring and enhancing performance of containers using a calibration technique.

In another example, the control system 170 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 7, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an Input/Output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media.

The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 8:
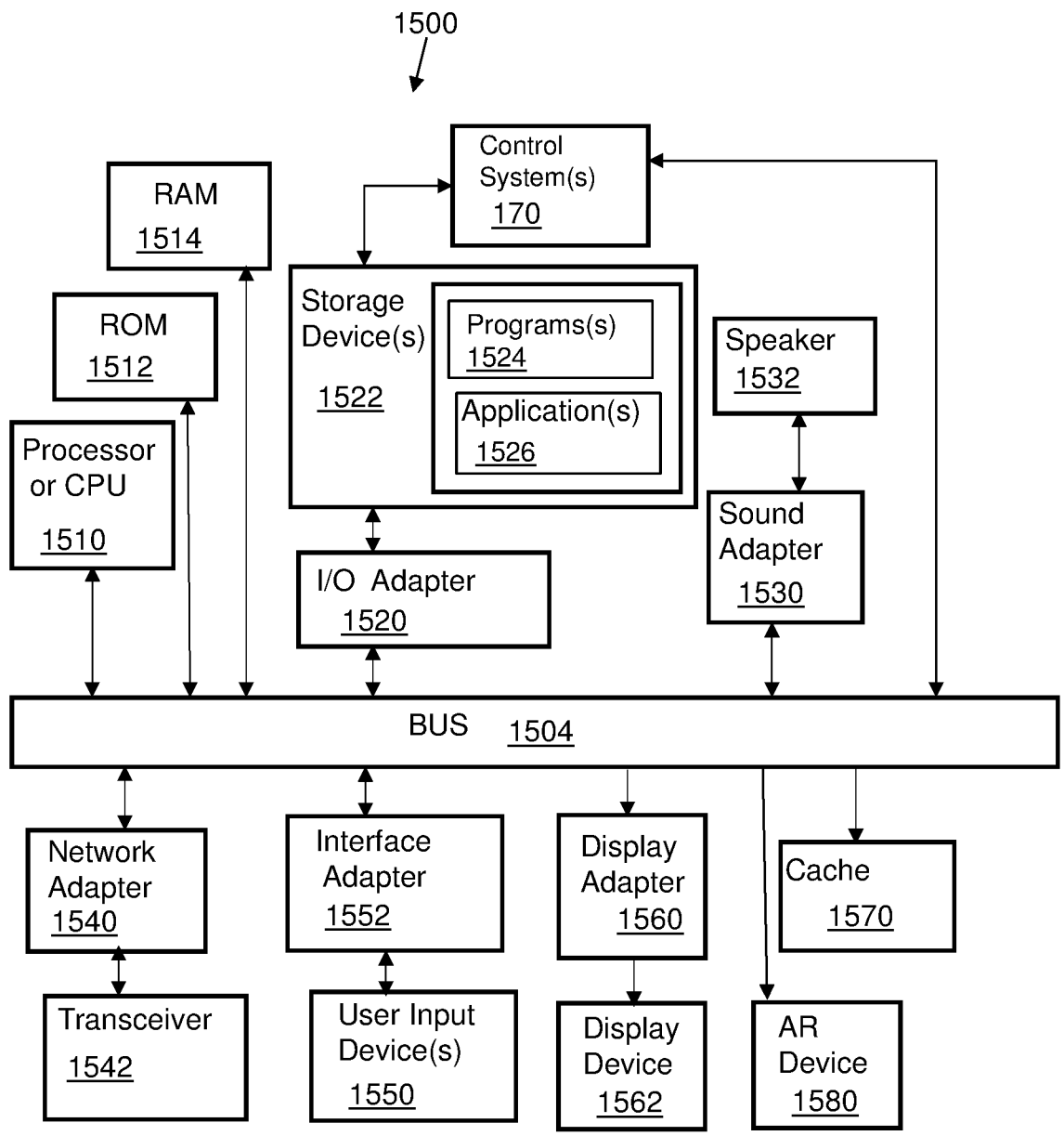
FIG. 8 is a schematic block diagram of a system depicting system components interconnected using a bus. The components for use, in all or in part, with the embodiments of the present disclosure, in accordance with one or more embodiments of the present disclosure.

Referring to FIG. 8, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an Input/Output (I/O) adapter 1520, a sound adapter 1530, a network adapter 1540, a user interface adapter 1552, a display adapter 1560 and a display device 1562, are also operatively coupled to the system bus 1504 of the system 1500. An AR device 1580 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
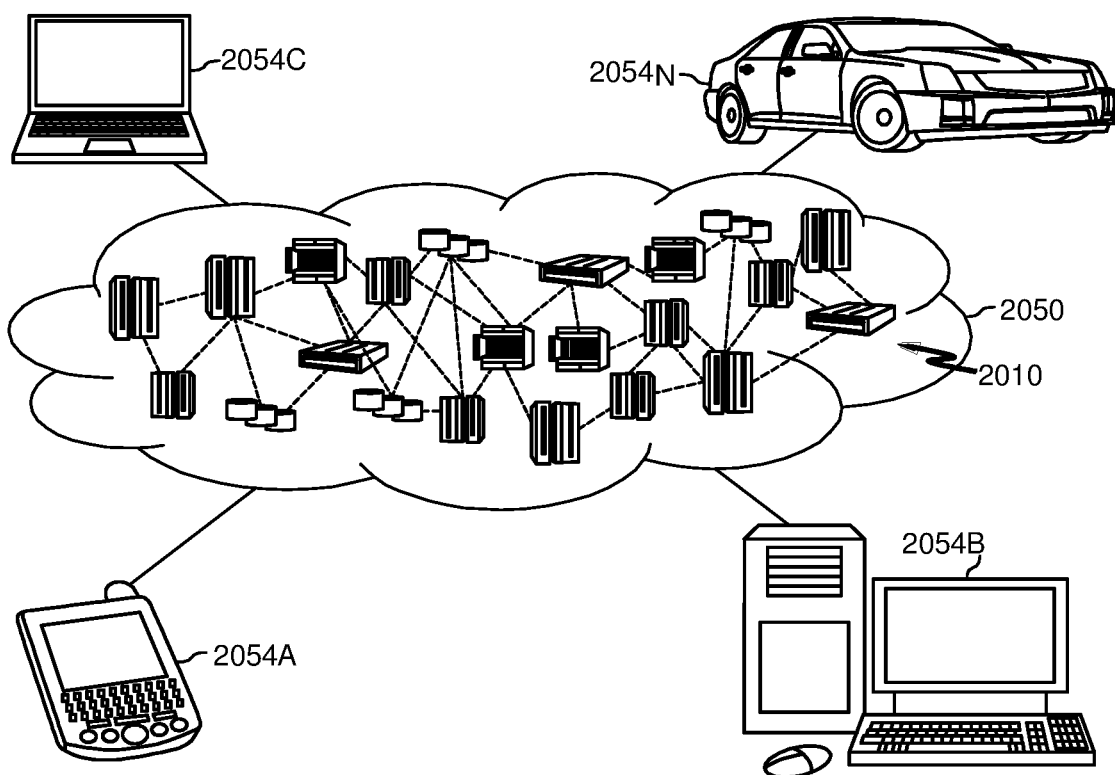
FIG. 9 is a block diagram depicting a cloud computing environment according to an embodiment of the present invention.

Referring now to FIG. 9, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 10:
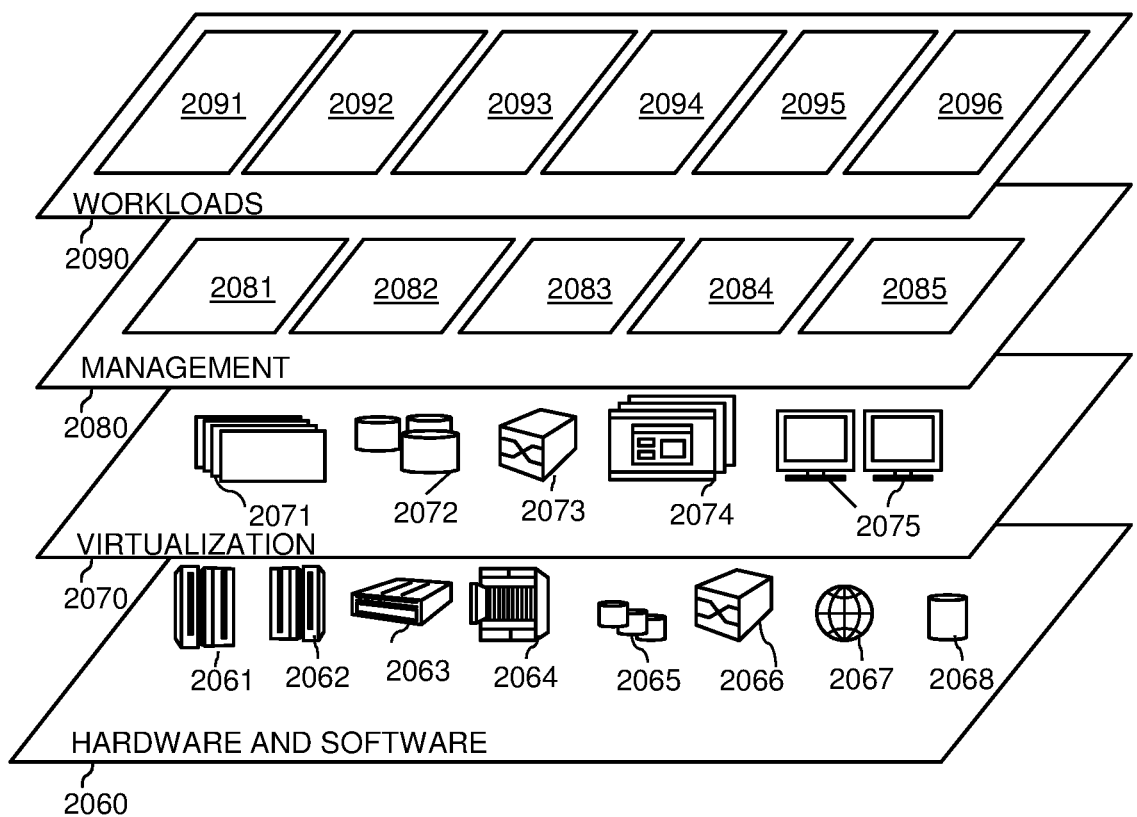
FIG. 10 is a block diagram depicting abstraction model layers according to an embodiment of the present invention.

Referring now to FIG. 10, a set of functional abstraction layers provided by cloud computing environment 2050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and implementing identification of objects 2096, for example, within a vicinity of an event, for instance, using an augmented reality (AR) device.

What is claimed is:

1. A computer-implemented method for identifying objects related to an event using networked computer system resources, comprising:

receiving a request, at a computer, to assess objects within a vicinity of an event for uses related to the event;

determining, using the computer, a type of the event and identifying objects within the vicinity based on information received from a device at the vicinity;

assessing the identified objects, using the computer, for applicability relating to the event;

scoring the identified objects based on applicability of each of the identified objects to the event;

ranking the identified objects based on the applicability score for each of the identified objects, and based on accessibility factors for each of the identified objects, the accessibility factors including locations of the identified objects, respectively, within the vicinity;

sending a notification, using the computer, to a user's device with the ranking for viewing by a user on a display of the user's device;

generating a model at least in part incorporating the assessing of the identified objects, the scoring of the identified objects, and the ranking of the identified objects;

updating a definition of the vicinity;

updating the location of the objects in the updated vicinity;

updating the assessing of the identified objects for applicability relating to the event;

updating the scoring of the identified objects based on each of the identified objects applicability relating to the event;

updating the ranking of the identified objects, based on the updated score and updated accessibility factors, the updated accessibility factors including the updated location of the updated identified objects, respectively, in relation to the user or the event; and sending an updated notification to the user's device with the updated ranking for viewing by the user on the display of the user's device.

2. The method of claim 1, wherein the objects applicability relates to a parameter of the event, and the parameter includes a data point about the event relevant to a proposed action in response to the event.

3. The method of claim 2, wherein the proposed action in response to the event includes a procedure in response to the event.

4. The method of claim 3, wherein the procedure includes a medical procedure or an emergency action related to the event.

5. The method of claim 1, wherein the event is a medical emergency.

6. The method of claim 1, wherein the user's device includes or communicates, at least in part, with an augmented reality (AR) device, the AR device being wearable by the user to assist in locating identified objects.

7. The method of claim 1, further comprising:
sending a communication to the user' device which includes instructions regarding one or more of the identified objects and the type of the event.

8. The method of claim 1, further comprising:
assessing the information received from the device at the vicinity for identification of a plurality of objects; and
generating a confidence score, using the computer, for an identification of one of the identified objects based on comparing the information to a knowledge corpus.

9. The method of claim 1, further comprising:
assessing the information received from the device at the vicinity for identification of a plurality of objects, and assessing the information for applicability of the plurality of object to the event; and
generating confidence scores, respectively, using the computer, for an identification of each of the identified objects, and for an applicability of the identified object, based on comparing the information to a knowledge corpus.

10. The method of claim 1, further comprising:
determining the location of the identified objects using networked devices.

11. The method of claim 1, further comprising:
determining the location of the identified objects includes using devices electronically communicating using a computer network.

12. The method of claim 1, wherein the computer network includes the Internet and the devices communicate using IoT.

13. The method of claim 1, further comprising:
iteratively updating the updated notification based detecting a change of a parameter of the event.

14. The method of claim 13, further comprising:
initiating two way communications with an AR device available to the user;
generating, using the computer communicating with the AR device, a recommendation for a procedure;
communicating the procedure to the AR device for communication to the user; and
iteratively communicating updated procedures to the AR device.

15. The method of claim 1, wherein the ranking of the accessibility factors includes the location of the identified objects, respectively, within the vicinity with respect to the user, and/or the type of the event, and/or a thing or a patient.

16. The method of claim 1, further comprising:
generating, using the computer communicating with an AR device available to the user, a recommendation for a procedure; and
communicating the procedure to the AR device for communication to the user.

17. A system using a computer for identifying objects related to an event using networked computer system resources, which comprises:
a computer system comprising; a computer processor, a computer-readable storage medium, and program instructions stored on the computer-readable storage medium being executable by the processor, to cause the computer system to perform the following functions to;
receive a request, at a computer, to assess objects within a vicinity of an event for uses related to the event;
determine a type of the event, using the computer, and identifying objects within the vicinity;
assess the identified objects, using the computer, for applicability relating to the event;
score the identified objects based on applicability of each of the identified objects to the event;
rank the identified objects based on the score for each of the identified objects, and based on accessibility factors for each of the identified objects, the accessibility factors including locations of the identified objects, respectively, within the vicinity;
send a notification, using the computer, to a user's device with the ranking for viewing by a user on a display of the user's device;
generate a model at least in part incorporating the assessing of the identified objects, the scoring of the identified objects, and the ranking of the identified objects;
update a definition of the vicinity;
update the location of the objects in the updated vicinity;
update the assessing of the identified objects for applicability relating to the event;
update the scoring of the identified objects based on each of the identified objects applicability relating to the event;
update the ranking of the identified objects based on the updated score, and updated accessibility factors, the updated accessibility factors including the updated location of the updated identified objects, respectively, to the user or the event; and
send an updated notification to the user's device with the updated ranking for viewing by the user on the display of the user's device.

18. A computer program product for identifying objects related to an event using networked computer system resources, the computer program product comprising a computer readable storage medium having program instructions embodied therewith, the program instructions executable by a computer to cause the computer to perform functions, by the computer, comprising the functions to:
receive a request, at a computer, to assess objects within a vicinity of an event for uses related to the event;
determine a type of the event, using the computer, and identifying objects within the vicinity;
assess the identified objects, using the computer, for applicability relating to the event;
score the identified objects based on applicability of each of the identified objects to the event;
rank the identified objects based on the score for each of the identified objects, and based on accessibility factors for each of the identified objects, the accessibility factors including locations of the identified objects, respectively, within the vicinity;
send a notification, using the computer, to a user's device with the ranking for viewing by a user on a display of the user's device;
generate a model at least in part incorporating the assessing of the identified objects, the scoring of the identified objects, and the ranking of the identified objects;
update a definition of the vicinity;
update the location of the objects in the updated vicinity;
update the assessing of the identified objects for applicability relating to the event;
update the scoring of the identified objects based on each of the identified objects applicability relating to the event;
update the ranking of the identified objects, based on the updated score and updated accessibility factors, the updated accessibility factors including the updated location of the updated identified objects, respectively, in relation to the user or the event; and
send an updated notification to the user's device with the updated ranking for viewing by the user on the display of the user's device.

* * * * *